Jan. 2, 1951   J. E. CHAPMAN ET AL   2,536,491
MOTOR HAVING AN ELECTROMAGNETIC BRAKE
Filed Aug. 31, 1945
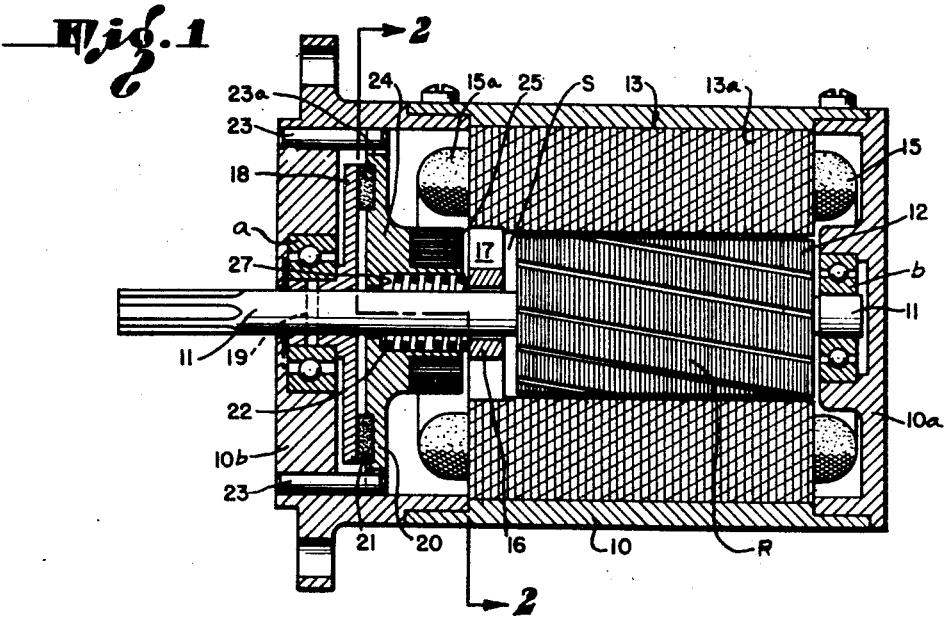
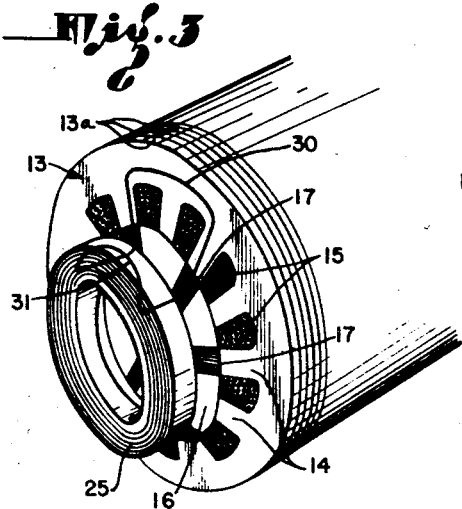
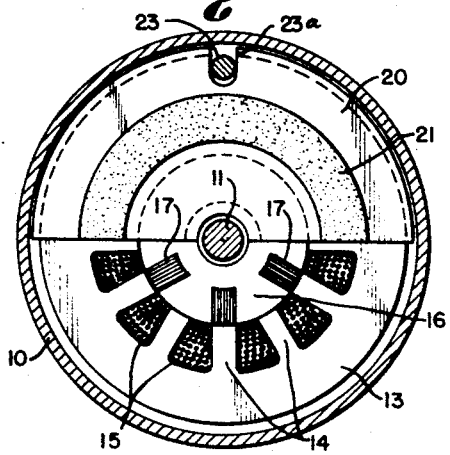
INVENTORS
JAMES E. CHAPMAN
JOHN C. DeHAAS
BY
ATTORNEY Patented Jan. 2, 1951

2,536,491

UNITED STATES PATENT OFFICE 2,536,491

MOTOR HAVING AN ELECTROMAGNETIC BRAKE

James E. Chapman and John C. De Haas, Phoenix, Ariz., assignors to The Garrett Corporation, Los Angeles, Calif., a corporation of California Application August 31, 1945, Serial No. 613,806

14 Claims. (Cl. 172—36)

This invention relates to automatic brakes for electric motors for quickly stopping the rotation of the rotor when the current is turned off, and relates in particular to a simple and effective magnetically released brake mechanism in which a portion of the magnetic flux of the motor field is employed as a force for releasing the brake.

It is an object of the invention to provide a mechanically released brake mechanism which can be used with many types of motors, which is compact in form and will add but little weight to the motor, but by a simple arrangement of parts will produce an effective braking action.

Automatic motor brakes are usually provided with spring means for applying the brakes, with electro-magnets for releasing the brakes against the force applied by the spring. Prior art devices are of two types—one type having electromagnets in addition to the field windings of the motor for releasing the brakes, and the second having magnet parts which are moved by flux generated by the field windings when an operating current is passed through the field windings to cause the motor to operate. In the case of motors intended for use where compactness and lightness of weight are important, for example—in aircraft and other vehicles—the prior art devices involve disadvantages due to increased weight resulting from the use of additional electromagnets, or from relatively complicated mechanisms for carrying out the braking function and the electromagnetic release of the brakes.

It is an object of the invention to provide an automatic motor brake which may be installed in one end of a motor casing adjacent the field and armature of the motor, which brake employs a few simple parts which, however, are capable of effectively braking the rotation of the rotor when the current is turned off, and which can be employed without material variation from standardized design in a number of different types of motors, including single, polyphase alternating current motors and the so-called universal or motors operated by either alternating or direct current.

It is a further object of the invention to provide an automatic motor brake having its cooperative parts so formed that a portion of the motor field flux may be employed for the brake releasing function, without any interference with the characteristics of the motor with which the brake is employed.

A further object of the invention is to provide a brake for electric motors having a brake releasing armature disposed at an end of the motor field, and means associated with the motor field for directing flux from the field when it is energized through a path including the brake armature, whereby this armature will be moved and thereby release the brake.

A further object of the invention is to provide an electric motor having bodies or projections of magnetic metal forming pole extensions in spaced relation to a brake releasing armature, whereby a portion of the field flux of the motor will be directed to the brake armature to accomplish the brake releasing function during the operation of the motor.

A further object of the invention is to provide an automatically released motor brake having a pair of brake elements disposed around the shaft at the end of the motor field and armature, one of these brake elements being stationary and the other rotating with the shaft, with a brake releasing armature so formed that it occupies a position clearing the projecting ends of the field windings and lying close to the motor field, this brake releasing armature being arranged to receive motor field flux to move it along the axis of the rotor, with sufficient force or pull to separate the brake element against the brake applying force of a spring.

Further objects and advantages of the invention will be brought out in the following part of the specification.

Referring to the drawing which is for illustrative purposes only,

Fig. 1 is a sectional view through a motor and brake combination embodying our invention.

Fig. 2 is a cross sectional view taken as indicated by the line 2—2 of Fig. 1.

Fig. 3 is a fragmentary perspective view showing the path taken by the flux in effecting the brake releasing function of the invention.

In the form of the invention shown, a motor frame or shell 10 is provided having heads 10a and 10b carrying bearings b and c for supporting a rotor R which consists of a laminated armature 12 supported by a shaft 11. The motor has a stator 13 which in the present disclosure is of the type employed in induction motor construction and comprises a stack of notched plates 13a, the stator 13 being made longer than the armature 12, so as to provide within one end of the stator 13 a space S. The stator 13 is provided with field windings 15, which, in keeping with standard practice, project from the ends of the stator field.

The stator field 13 is provided with means for directing a small portion of the magnetic flux generated in the field when current flows through the windings 15 through a path or paths external to the field 13 for use in accomplishing the brake releasing function, as will be hereinafter described. To accomplish this result we provide a supporting body 16 of non-magnetic material, made in the form of an annulus so that it will fit around the shaft 11 and within the space S in the end of the field 13. The member 16 supports around its periphery a plurality of bodies 17 of magnetic material spaced, as shown in Fig. 2, so that they will be aligned with and contact selected walls 14 of the field 13 between the slots of the field which receive the field windings 15. The bodies 17 are each composed of a plurality of thin plates disposed in side by side relation and extending parallel to the axis of rotation of the rotor R, for a purpose which will be later described herein.

A brake element 18 is disposed in spaced relation to the end of the field 13, for cooperation with a brake element 20 which is disposed between the brake element 18 and the field 13, one of the brake elements being stationary and the other being rotatable with the shaft 11, a spring 22 being provided for urging the elements 18 and 20 into braking engagement. In the present disclosure the brake element 18 consists of a disc which is fixed on the shaft 11 by a pin 19, the hub of this element 18 serving as a seat for the bearing c. Likewise, in the present disclosure, the brake element 20 is non-rotating and has thereon a facing 21 for engagement with the face of the brake element 18. The brake element 20 is slidably keyed to the motor housing so that it may have movement along the axis of the shaft 11 a sufficient distance to accommodate the brake operating effect. For this purpose, we show pins 23 projecting in through the head 10b so that the inner ends thereof may engage notches 23a in the periphery of the disc comprising the non-rotating brake element 20.

The brake element 20 has a central opening through which the shaft 11 is extended, and has operatively connected to it a brake releasing armature 25 which laps the projecting portions 15a of the field windings 15, thereby bringing the armature 25 into close relation to the end of the field 13. By the term "lap" we mean that the armature 25 extends into or through a plane normal to the axis of the shaft 11, which plane also intersects the projecting portion 15a of the windings 15, or that the portions 15a are disposed in telescoping relation to the armature 25.

In the disclosed form of the invention the armature 25 is an annulus of magnetic material having low hysteresis characteristics and consists in a coil formed from a strip of electric steel or sintered iron. This armature 25 is connected to the brake element 20 by means of a boss 24 which projects from the element 20 toward the armature 12 and is suitably shouldered so as to support the armature 25 in face to face relation to the magnetic poles or bodies 17. The spring 22 lies within the boss 24 with one end thereof engaging the support 16 and the other end engaging a shoulder 27 within the boss 24.

When the current to the motor is turned off, the spring 22 urges the brake element 20 into engagement with the brake element 18 to restrain the rotor from rotation. When the motor current is turned on, a portion of the field flux produced by the windings 15 is directed by the poles 17 to the brake armature 25, attracting the armature 25 toward the field 13, or, in other words, toward the bodies 17 which constitute projections or extensions from the field 13, against the force of the spring 22, to move the friction ring 21 out of engagement with the rotating brake element 18, thereby permitting a free rotation of the motor rotor.

In the fragmentary perspective view, Fig. 3, is shown one of the flux paths 30 instituted when the field windings 15 are electrically energized for the purpose of operating the motor. It will be perceived that the flux path 30 lies partly within the field 13 and extends radially inward within two adjacent bodies or pole extensions 17 and then from the poles 17 passes through a portion of the armature 25 as shown at 31. The flux path 30 defines a small magnetic field, part of which lies in the motor field 13 and another part of which lies within the armature 25. The magnetic field contraction effect which takes place in the magnetic field thus formed, pulls the armature 25 forcibly and tightly against the lateral faces of the poles 17. It will be noted that the laminae 17a of which the bodies 17 are formed, lie in crossing relation to the laminae 13a at the leftward end of the field 13, and that these laminae 17a are therefore aligned with the direction of flow of flux from the field 13 through the bodies 17 to the armature 25. Also the separate turns of the strip or ribbon of which the brake armature 25 is formed lie in crossing relation to the laminae 17a so that the flux may flow from one pole extension 17 to another into and through the turns of the ribbon with a minimum crossing of the flux from one turn to another. Accordingly, in passing from the field 13 to the armature 25, the flux is not required to cross from one lamination 17a to another, but may flow within the laminations 17a along paths which are parallel to the surfaces thereof.

We claim as our invention:

1. In a brake for an electric motor having a stator with an electromagnetic field and a rotor disposed in said field, there being a shaft projecting from said rotor, the combination of: brake means disposed adjacent said rotor, said brake means comprising a rotating part connected to said shaft in spaced relation to an end of said field and a non-rotating part between said rotating part and the end of said field and being movable along the axis of said shaft, said non-rotating part comprising magnetic material to form an armature; yielding means urging said non-rotating part into braking engagement with said rotating part; and means associated with said field for diverting magnetic flux from said field to said brake armature when said field is energized, whereby said flux will move said armature and the movement of said armature will cause disengagement of said parts of said brake means and thereby release said brake means during the time the motor is energized.

2. In a brake for an electric motor having a stator with an electromagnetic field and a rotor disposed in said field, there being a shaft projecting from said rotor, the combination of: a rotating brake element connected to said shaft in spaced relation to an end of said field; an annular armature disposed between said brake element and said field and being movable along the axis of said shaft; a non-rotating brake element between said rotating brake element and said field having connection with said armature whereby movement of said armature toward said field will move said non-rotating brake element away from said rotating brake element; spring means urging said non-rotating element toward said rotating element; and separated bodies of magnetic material between said field and said armature forming paths for the flow of flux from said field and through said armature whereby said armature will be attracted toward said field when said field is energized.

3. In a brake for an electric motor having a stator with an electromagnetic field and a rotor disposed in said field, there being a shaft projecting from said rotor, the combination of: a rotating brake element connected to said shaft in spaced relation to an end of said field; an annular armature disposed between said brake element and said field and being movable along the axis of said shaft; a non-rotating brake element between said rotating brake element and said field having connection with said armature whereby movement of said armature toward said field will move said non-rotating brake element away from said rotating brake element; spring means urging said non-rotating element toward said rotating element; and annularly spaced bodies of magnetic material extending radially inward from the end of said field toward said shaft so as to be disposed between said field and said armature forming paths for the flow of flux from said field and through said armature whereby said armature will be attracted toward said field when said field is energized.

4. In a brake for an electric motor having a stator with an electromagnetic field consisting of a plurality of annular laminae stacked lengthwise of the axis of said stator and a rotor disposed in said field, there being a shaft projecting from said rotor, the combination of: a rotating brake element connected to said shaft in spaced relation to an end of said field; an annular armature disposed between said brake element and said field and being movable along the axis of said shaft; a non-rotating brake element between said rotating brake element and said field having connection with said armature whereby movement of said armature toward said field will move said non-rotating brake element away from said rotating brake element; spring means urging said non-rotating element toward said rotating element; and bodies of magnetic material between said field and said armature forming paths for the flow of flux from said field and through said armature whereby said armature will be attracted toward said field when said field is energized, each of said bodies comprising a plurality of laminae in face to face relation and extending in parallelism to a plane which is parallel to said axis and so as to lie in crossing relation to the end lamination of said field.

5. In a brake for an electric motor having a stator with an electromagnetic field comprising windings which project from the end thereof and a rotor disposed in said field, there being a shaft projecting from said rotor, the combination of: brake means disposed adjacent said rotor, said brake means comprising a rotating part connected to said shaft in spaced relation to an end of said field and a non-rotating part between said rotating part and the end of said field and being movable along the axis of said shaft, said non-rotating part comprising magnetic material to form an armature of a size to project into the space defined by the projecting portions of said windings; spring means urging said non-rotating part into braking engagement with said rotating part; and an annular holder of non-magnetic material disposed in the end of said field, said holder carrying bodies of magnetic material within the end of said field and adjacent said armature for diverting magnetic flux from said field to said armature, each of said bodies comprising laminae extending substantially parallel to the axis of rotation of said rotor when said field is energized whereby said flux will move said armature and the movement of said armature will cause disengagement of said parts of said brake means and thereby release said brake means during the time the motor is energized.

6. In a brake for an electric motor having a stator with an electromagnetic field comprising windings which project from the end thereof and a rotor disposed in said field, there being a shaft projecting from said rotor, the combination of: brake means disposed adjacent said rotor, said brake means comprising a rotating part connected to said shaft in spaced relation to an end of said field and a non-rotating part between said rotating part and the end of said field and being movable along the axis of said shaft, said non-rotating part comprising a ribbon of magnetic material coiled so as to form an armature of a size to project into the space defined by the projecting portions of said windings; spring means urging said non-rotating part into braking engagement with said rotating part; and an annular holder of non-magnetic material disposed in the end of said field, said holder carrying bodies of magnetic material within the end of said field and adjacent said armature for diverting magnetic flux from said field to said armature, each of said bodies comprising laminae extending substantially parallel to the axis of rotation of said rotor when said field is energized whereby said flux will move said armature and the movement of said armature will cause disengagement of said parts of said brake means and thereby release said brake means during the time the motor is energized.

7. In a brake for an electric motor having a stator with an electromagnetic field and a rotor disposed in said field, there being a shaft projecting from said rotor, the combination of: a rotating brake element connected to rotate with said shaft; a non-rotating brake element between said rotating brake element and said field, one of said brake elements being movable toward and away from the other brake element; an armature connected to said movable brake element and disposed between said movable brake element and said field; spring means urging the movable brake element toward the other brake element; and bodies of magnetic material between said field and said armature forming paths for the flow of flux from said field and through said armature whereby said armature will be attracted toward said field when the latter is energized, each of said bodies comprising a plurality of laminae in face to face relation and extending in parallelism to a plane which is parallel to said axis.

8. In a brake for an electric motor having a stator with an electromagnetic field and a rotor disposed in said field, the combination of: a rotating brake element mounted to rotate with said rotor; a non-rotating brake element movable into engagement with said rotatable brake element; means for holding said brake elements in engagement when said stator is deenergized; stationary bodies of magnetic material spaced apart from each other and projected inwardly adjacent one end of said stator between said rotor and said non-rotating brake element; and an armature of magnetic material carried by said non-rotating brake element in a position adjacent to said separated bodies of magnetic material.

9. In a brake for an electric motor having a stator with an electromagnetic field and a rotor disposed in said field, the combination of: a rotating brake element mounted to rotate with said rotor; a non-rotating brake element, said brake elements being spaced from said field and one of said brake elements being movable into engagement with the other of said elements; yielding means for urging said movable element into engagement with said other element when the stator is deenergized; bodies of magnetic material annularly separated from each other and disposed within the stator adjacent one end thereof and located between the rotor and the movable brake element; and an armature of magnetic material connected to said movable brake element in a position adjacent to said separated bodies of magnetic material but spaced therefrom when the stator is deenergized, said armature being movable into substantial engagement with said bodies of magnetic material when the stator is energized.

10. In a brake for an electric motor having a stator with an electromagnetic field and a rotor disposed in said field, the combination of: a rotating brake element mounted to rotate with said rotor; a non-rotating brake element, one of said brake elements being spaced from an end of said field and the other of said brake elements being axially movable relative to the other of said elements; yielding means for urging said movable element into engagement with said other element when the stator is deenergized; an armature of magnetic material connected to said movable brake element; and means for attracting said armature and effecting disengagement of said brake elements when the stator is energized, said means including bodies of magnetic material spaced from each other and forming paths for the flow of magnetic flux from the stator to the armature and back to the stator.

11. In a brake for an electric motor having a stator with an electromagnetic field with field windings which project from the end of said field and a rotor disposed in said field, there being a shaft projecting from said rotor, the combination of: brake means disposed adjacent said rotor, said brake means comprising a rotating part connected to said shaft in spaced relation to an end of said field and a non-rotating part between said rotating part and the end of said field and being movable along the axis of said shaft, said non-rotating part having means thereon forming an armature of such diameter that it will enter into the space defined by the portions of said field windings which project from said field; spring means urging said non-rotating part into braking engagement with said rotating part; and means associated with said field for diverting magnetic flux from said field to said brake armature when said field is energized, whereby said flux will move said armature and the movement of said armature will cause disengagement of said parts of said brake means and thereby release said brake means during the time the motor is energized.

12. In a brake for an electric motor having a stator with an electromagnetic field and a rotor disposed in said field, the combination of: a rotating brake element mounted to rotate with said rotor; a non-rotating brake element, one of said brake elements being axially movable relative to the other of said elements; yielding means for urging said movable element into engagement with said other element when the stator is deenergized; stationary bodies of magnetic material spaced apart from each other and projecting inwardly adjacent one end of the stator between the rotor and the axially movable brake element; and an armature of magnetic material connected to said axially movable brake element in a position adjacent to said separated bodies of magnetic material but spaced therefrom.

13. In a brake for an electrode having a stator with an electromagnetic field and a rotor disposed in said field: a rotating brake element mounted to rotate with said rotor; a non-rotating brake element movable into engagement with said rotatable brake element; means for holding said brake elements in engagement when said stator is deenergized; an armature of magnetic material for said non-rotating brake element, said armature being disposed adjacent to one end of said stator; and means associated with said stator to form definite, separated paths for the flow of magnetic flux from the stator to the armature and back to the stator.

14. In a brake for an electric motor having a stator with an electromagnetic field and a rotor disposed in said field, the combination of: a rotating brake element mounted to rotate with said rotor; a non-rotating brake element spaced from said field and axially movable relative to the other of said elements; a stationary holder of non-magnetic material at one end of said field; yielding means reacting between said holder and said axially movable brake element for urging said axially movable element into engagement with said other element when the stator is deenergized; bodies of magnetic material mounted in said holder, said bodies being separated from each other and projecting inwardly adjacent one end of the stator between the rotor and the axially movable brake element; and an armature of magnetic material connected to said axially movable brake element in a position adjacent to said separated bodies of magnetic material but spaced therefrom when the field is deenergized.

JAMES E. CHAPMAN.
JOHN C. DE HAAS.

REFERENCES CITED

The following references are of record in the file of this patent:

UNITED STATES PATENTS

| Number | Name | Date |
|---|---|---|
| 1,003,649 | Podlesak et al. | Sept. 19, 1911 |

FOREIGN PATENTS

| Number | Country | Date |
|---|---|---|
| 468,826 | Great Britain | July 13, 1937 |
| 491,469 | Great Britain | Sept. 2, 1938 |